(12) United States Patent
Steinbach et al.

(10) Patent No.: US 8,341,031 B2
(45) Date of Patent: Dec. 25, 2012

(54) AVAILABILITY CHECK FOR A WARE

(75) Inventors: Jochen Steinbach, Bad Schoenborn (DE); Andreas Poth, Weingarten (DE)

(73) Assignee: SAP AG, Walldorf (DE)

( * ) Notice: Subject to any disclaimer, the term of this patent is extended or adjusted under 35 U.S.C. 154(b) by 1106 days.

(21) Appl. No.: 12/037,597

(22) Filed: Feb. 26, 2008

(65) Prior Publication Data

US 2009/0216614 A1    Aug. 27, 2009

(51) Int. Cl.
*G06Q 30/00* (2006.01)
(52) U.S. Cl. .......................................... 705/26.2; 705/28
(58) Field of Classification Search .................. 700/100, 700/101; 705/22, 28, 36, 26.2
See application file for complete search history.

(56) References Cited

U.S. PATENT DOCUMENTS

| | | |
|---|---|---|
| 6,272,389 B1 * | 8/2001 | Dietrich ........................ 700/101 |
| 2002/0072988 A1 * | 6/2002 | Aram .............................. 705/26 |
| 2002/0143669 A1 * | 10/2002 | Scheer ............................ 705/28 |
| 2005/0096998 A1 | 5/2005 | Gieselmann et al. |
| 2005/0289007 A1 | 12/2005 | Glebe |
| 2006/0036516 A1 | 2/2006 | Glebe |
| 2006/0041465 A1 | 2/2006 | Woehler |
| 2007/0094102 A1 | 4/2007 | Huber-Buschbeck et al. |
| 2007/0130029 A1 | 6/2007 | Von Helmolt et al. |
| 2007/0219929 A1 | 9/2007 | Steinbach |
| 2007/0226067 A1 | 9/2007 | Fuchs et al. |

OTHER PUBLICATIONS

John T Blake, Michael W Carter, A goal programming approach to strategic resource allocation in acute care hospitals, European Journal of Operational Research. Amsterdam: Aug. 1, 2002. vol. 140, Iss. 3; p. 541 (Attached).*
"Background: Analysis of (s-I, s) and Order-Up-To-Policies," in Muckstadt, *Analysis and Algorithms for Service Parts Supply Chains* (New York, Springer, 2005), pp. 15-21.

\* cited by examiner

*Primary Examiner* — Scott Zare
*Assistant Examiner* — Rokib Masud
(74) *Attorney, Agent, or Firm* — Fish & Richardson P.C.

(57) ABSTRACT

Computer-implemented methods, and associated computer program products and systems, for checking availability of a ware in a time interval, a resource to produce the ware being associated with the ware. The computer-implemented method can include obtaining capacity supply information comprising a capacity supply for each date of the time interval and capacity demand information comprising a capacity demand for each date of the time interval. The first date of the time interval is set to a later date, there is determined for each date from the first date to the later date whether capacity supply is unused. If capacity supply is unused, the method includes eliminating the specific amount from the capacity supply information. In response to demand information representing a demand having a requested date, availability of the resource on the requested date is determined using the capacity supply information and the capacity demand information.

20 Claims, 12 Drawing Sheets

AVAILABILITY CHECK FOR A WARE

TECHNICAL FIELD

This document relates to computing systems and methods executed therein to perform availability check of a ware.

BACKGROUND

A supply chain management computing system may be used to plan, implement and control the operations of a supply chain as efficiently as possible and may span all movement and storage of raw materials, inventory, and finished products.

Availability check, also known as ATP (availability-to-promise) check, is an important tool within supply chain management in order to provide an answer to the question if a requested quantity of a ware, for example a material or product, is available on a requested date. For determining if a ware is available, or if an overconfirmation is present otherwise, stock, planned inward movements and planned outward movements, like for example sales orders, may be considered. In the case of customer demand, a sales order is a customer request to the company for the delivery of wares, for example goods or services, at a certain time.

In make-to-stock environments, confirmations can usually be made based on product availability due to sufficient supply on stock. However, when dealing with make-to-order environments, there is often only little or no supply on stock. When a demand, or also referred to as requirement, is received, the availability check may have to be not mainly based on checking product availability (product availability check (PAC)), but on checking capacity availability (capacity availability check (CAC)) of one or more resources needed to produce the ware. In cases where there is no stock at all present, the availability check may merely be based on checking the capacity availability.

In an example manufacturing supply chain management computing system, the system may include capacity availability check suitable for checking the availability of a ware, the ware having a resource to produce the ware. In a typical case, when a customer demand, like a sales order, is received, a planned production order is created and is directly associated with the demand (lot-to-lot environment). The production order may then be included into a production plan using finite scheduling and by doing so checking the availability and capacity of the resource needed. Each time a demand is received, the production plan is changed.

SUMMARY

Computer-implemented methods, and associated computer program products and systems, are disclosed for checking availability of a ware in a time interval, a resource to produce the ware being associated with the ware.

In one aspect, the computer-implemented method includes obtaining capacity supply information of the resource comprising a capacity supply for each date of the time interval and obtaining capacity demand information for the resource comprising a capacity demand for each date of the time interval. In response to receiving an update information indicating that the first date of the time interval is set to a later date, the method further includes determining for each date from the first date to the later date whether capacity supply is unused. If a specific amount of capacity supply is unused, the method includes eliminating the specific amount of capacity supply from the capacity supply information. Finally, in response to receiving a demand information representing a demand having a requested date, the method includes determining availability of the resource on the requested date using the capacity supply information and the capacity demand information.

In various implementations, the methods may include one or more of the following features. The capacity supply and the capacity demand may each be cumulated starting from a first date of the time interval. The step of obtaining the capacity supply information may comprise defining a capacity constraint of the resource. Furthermore, the step of obtaining the capacity supply information may comprise defining a capacity load of the resource for a unit of the ware. The step of determining for a specific date whether capacity supply is unused may comprise obtaining an amount of used capacity of the resource, used to produce ware on the specific date. In such a case, a specific amount of capacity supply is unused, provided that the capacity supply on the specific date is greater than the amount of used capacity of the resource on the specific date. The amount of used capacity of the resource may then be associated with a production order of the ware. Also, the resource may be used to produce at least one other ware. Similarly, at least one other resource may be associated with the ware. Finally, the resource may be a bottleneck resource.

In another aspect, a computer program product is disclosed. The computer program product is tangibly embodied in a computer-readable storage medium and includes instructions that, when executed, perform operations for checking availability of a ware in a time interval, a resource to produce the ware being associated with the ware, as described in connection with the methods described above. In yet another aspect, systems are disclosed that are capable of checking availability of a ware in a time interval, a resource to produce the ware being associated with the ware, as described in connection with the methods described above.

Implementations can provide any, all or none of the following advantages. When a demand information is received representing a demand having a requested date, no planned production order needs to be directly associated with that demand. This means that no lot-to-lot environment is required, but lot seizing is feasible. Thus the production plan does not need to be changed each time a new demand is received. The confirmation process of demands and the detailed production planning are clearly separated from each other. Furthermore, the above described method may provide a simple and fast capacity availability check based on known product availability check methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
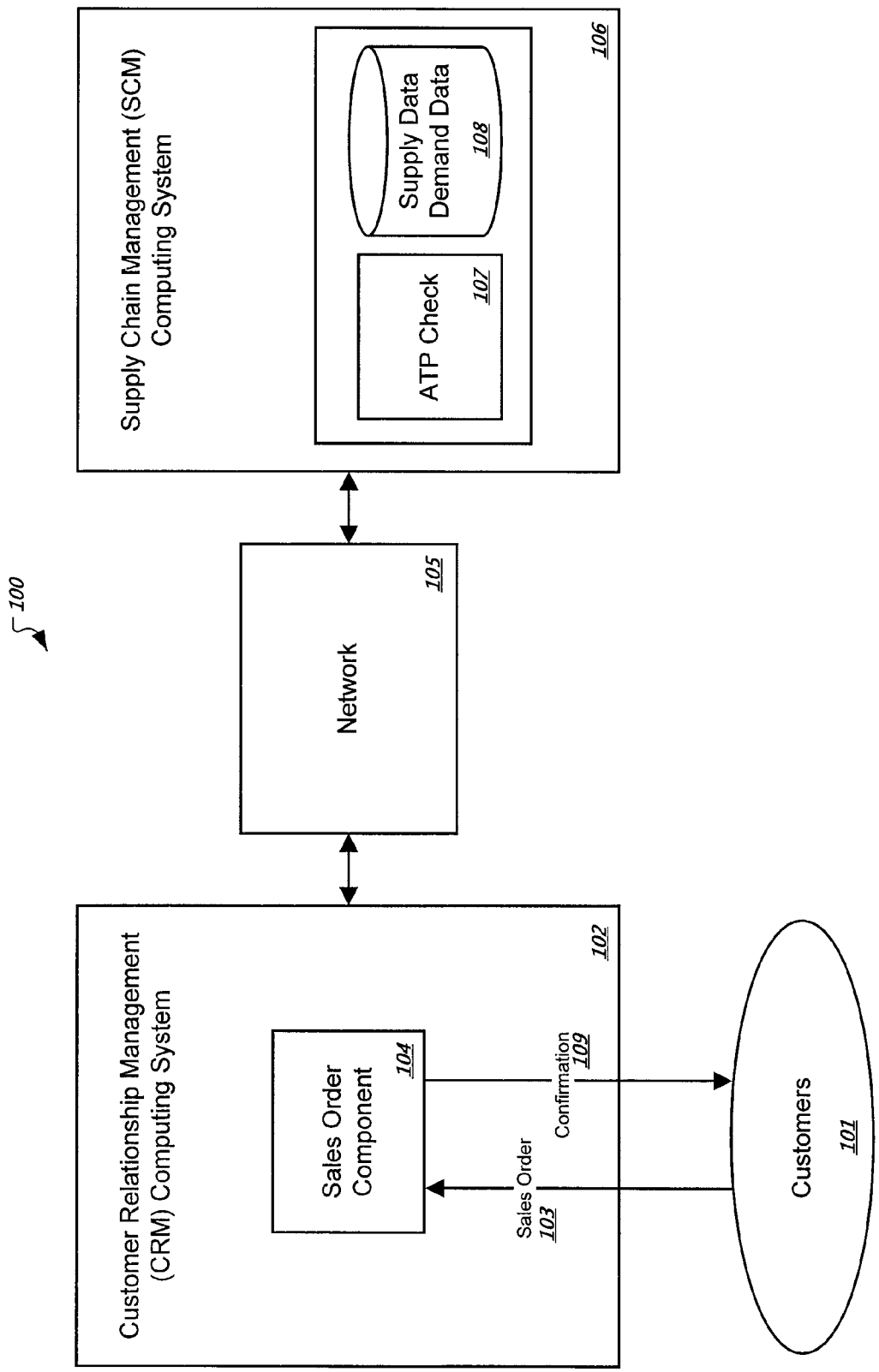
FIG. 1 is a block diagram of an exemplary system in which a supply chain management computing system is used.

FIG. 1 is a block diagram of an exemplary system 100 in which a supply chain management (SCM) computing system 106 is used. Customers 101 may place sales orders 103, forming a demand requesting a ware in this example. The sales orders are sent to a sales order component 104 within a customer relationship (CRM) computing system 102. The sales order data, also referred to as demand data, may be sent via a network 105 or any other suitable means to supply chain management system 106. An ATP (Availability-to-promise) check component 107, also referred to as availability check component, may be part of supply chain management computing system 106.

Even though the demands referred to in FIG. 1 are sales orders placed by customers, availability check may also be used for other kinds of demands. For example for internal processes within a company the demands may be production (manufacturing) orders, purchase orders or planned orders. Also, while this and other examples herein refer to products being supplied and/or demanded, other wares than products can be considered as well. In other implementations, wares such as services can be supplied and/or demanded, for example in a computer system that schedules availability of consultants or other professionals.

ATP check component 107 may be placed within any suitable platform or system. In one implementation, the ATP check component may be placed within an Enterprise Resource Planning (ERP) System, for example the R/3 system by SAP AG Walldorf, Germany. In another implementation, the ATP check component may be placed within an Advanced Planning and Information (APO) system, for example the APO system by SAP AG, Walldorf, Germany. In yet another implementation, the ATP check may be placed within a system for small and medium sized businesses, like for example a Business By Design system by SAP AG, Walldorf, Germany.

ATP check component 107 may be able to access supply and demand data 108 and perform a availability check for a demand having a requested date. When there are multiple demands for a ware, it might be the case that more demand is confirmed on a certain date than supply is available on that specific date. In such a case, an overconfirmation is present on that date. Overconfirmations may for example occur when a change is made in the supply and demand data, for example when a requested date or quantity of a demand is changed or when a supply delivery changes. Demands that had a confirmed date and quantity up to that point of time, might no longer be confirmed after a change in the supply and demand data has occurred.

Figure 2:
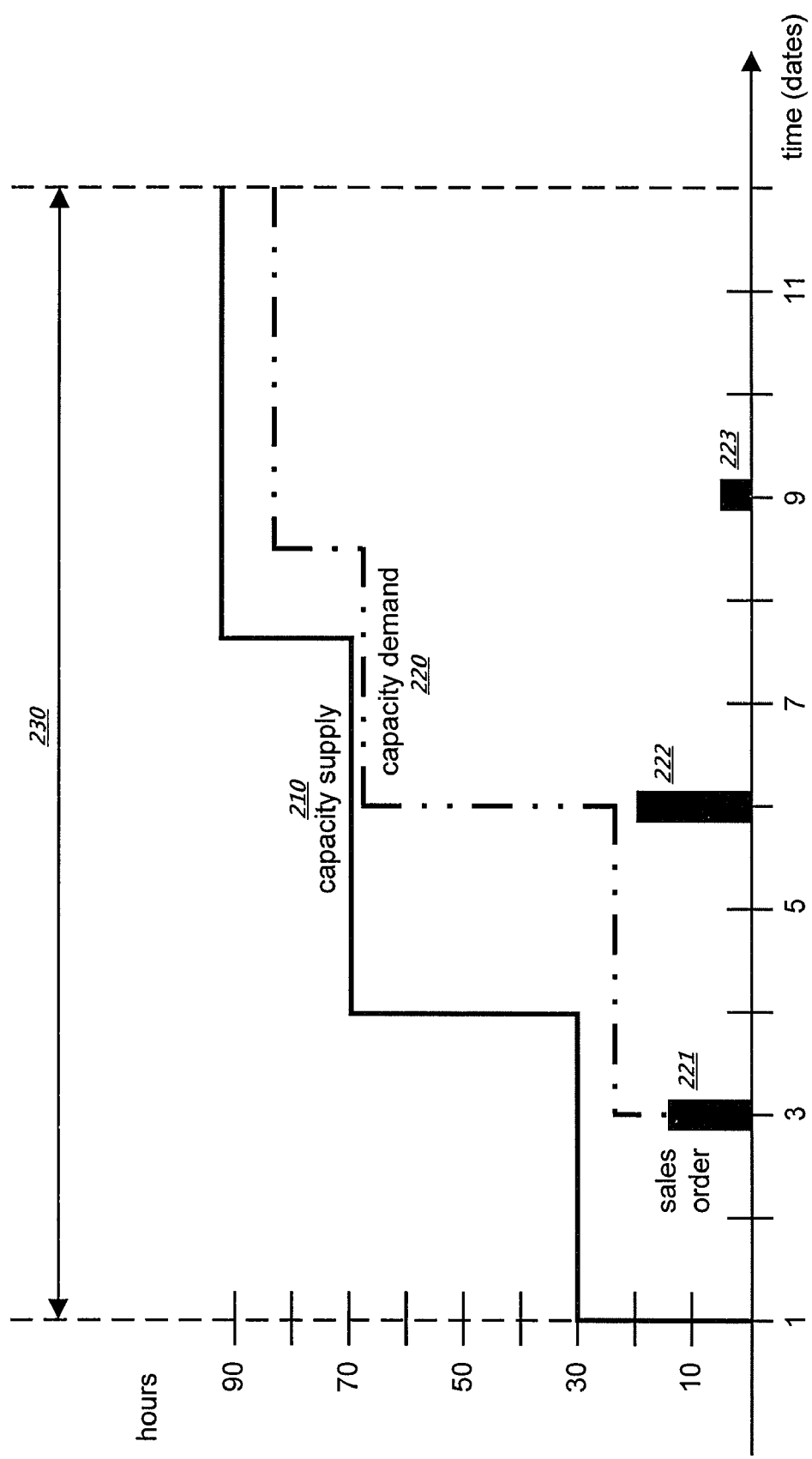
FIG. 2 shows an exemplary capacity supply and capacity demand information.

Referring to FIG. 2, an exemplary capacity supply and capacity demand information is shown. A cumulated capacity supply 210 and a cumulated capacity demand 220, also referred to as capacity supply and capacity demand time series, are plotted over a certain time interval 230. Cumulated here indicates that all supplies, and demands respectively, are cumulated starting from the first date of the time interval 230, which is date 1 in this example. The time may be measured in any suitable measure, like for example any discrete dates or time periods. In one implementation, the time may be measured in buckets for example. The capacity demand 220 is formed by sales orders 221, 222, 223 of different requested amounts (amounts are indicated by height of sales order in a not to scale manner) on different requested dates. The amounts may be converted into hours of capacity or vice versa. As long as the capacity demand 220 is not greater than the capacity supply, there is no overconfirmation situation present.

A ware demand, like a sales order, may have different operations (activities) needed to produce the ware. These different operations may have to be carried out using different resources, or even at different work centers. Therefore, not only one resource may be associated with a ware, but at least one other resource may also be associated therewith.

Figure 3:
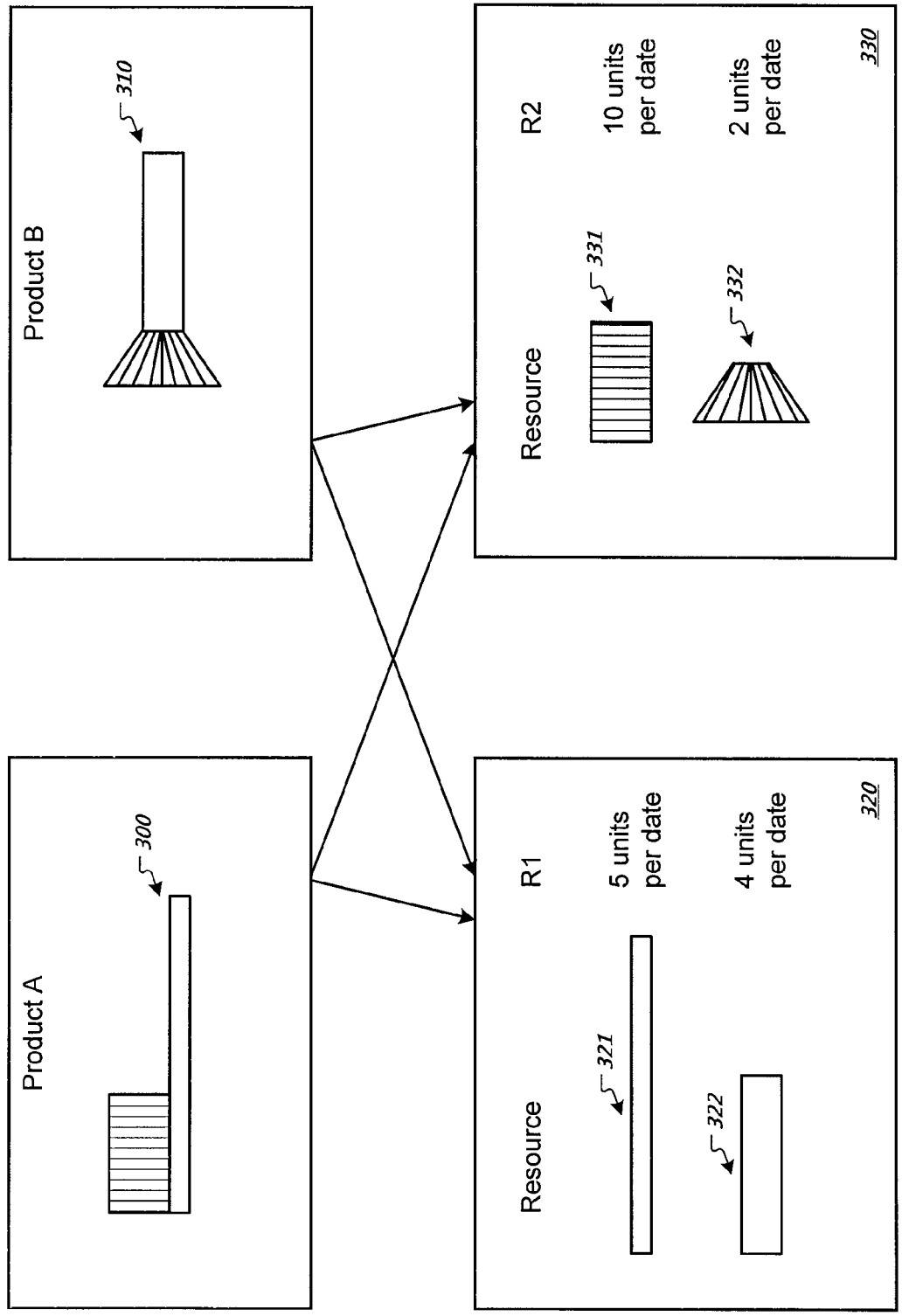
FIG. 3 is a diagram showing an exemplary production of two wares, each using two resources.

FIG. 3 shows an exemplary production of two wares using each two resources. In this example, for producing product A 300, for example a toothbrush, a first part 321 and a second part 322 is needed. First part 321 of product A is produced by resource R1, being able to produce 5 units of the first part 321 per date which is the capacity constraint of resource R1 for product A. Second part 322 of product A is produced by resource R2, being able to produce 10 units of the second part 322 per date which is the capacity constraint of resource R2 for product A. For product A, resource R1 may for example be determined as being a bottleneck resource. In some implementations, a resource may be considered a bottleneck resource if its capacity constraints are such that they directly affect the ability to effectively produce the ware; that is, the bottleneck resource can be viewed as holding up the production of the ware at one or more stages. Similarly, for producing product B 310, for example another type of brush, a first part 331 and a second part 332 is needed. First part 331 of product B is produced by resource R1, being able to produce 8 units of the first parts 331 per date which is the capacity constraint of resource R1 for product B. Second part 332 of product B is produced by resource R2, being able to produce 3 units of the second parts 332 per date which is the capacity constraint of resource R2 for product B. For product B, resource R2 may for example be determined as being the bottleneck resource. Accordingly, a resource may be used to produce not only one single ware, but may be used to produce at least one other ware.

Figure 4:
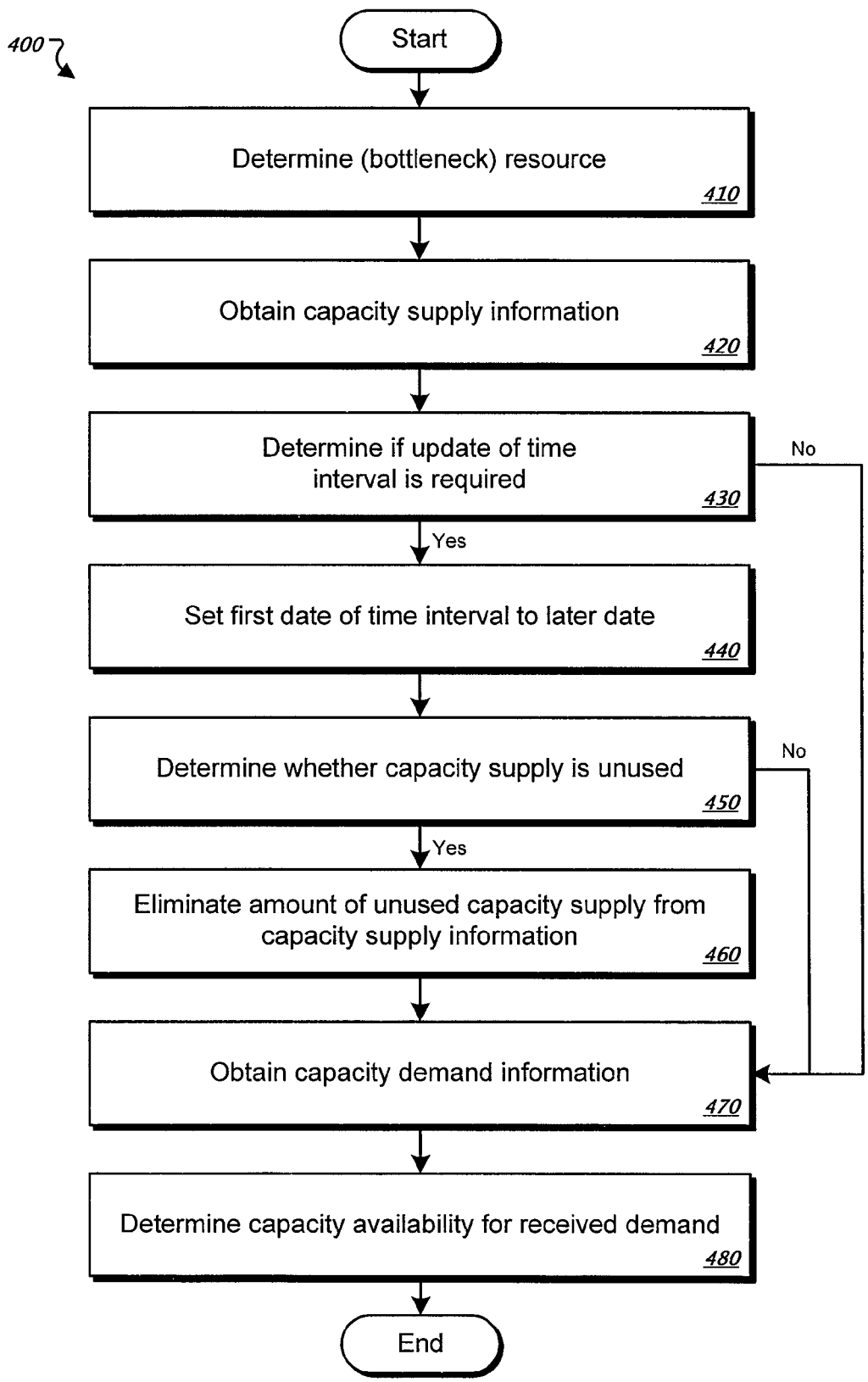
FIG. 4 is a flowchart showing a computer-implemented method for checking the availability of a ware in a time interval.

FIG. 4 is a flowchart showing a computer-implemented method for checking the availability of a ware in a time interval. In step 410, a resource to produce the ware may be determined, the resource therefore being associated with the ware. In general, the resource can be any resource used to produce the ware. In one implementation, the resource may be a bottleneck resource for producing the ware as explained with reference to FIG. 3. In other implementations, multiple bottleneck resources may be determined.

Next, in step 420, capacity supply information is obtained, comprising a capacity supply for each date of the time interval. The capacity supply may be cumulated starting from the first date of the time interval as explained with reference to FIG. 2.

Figure 4A:
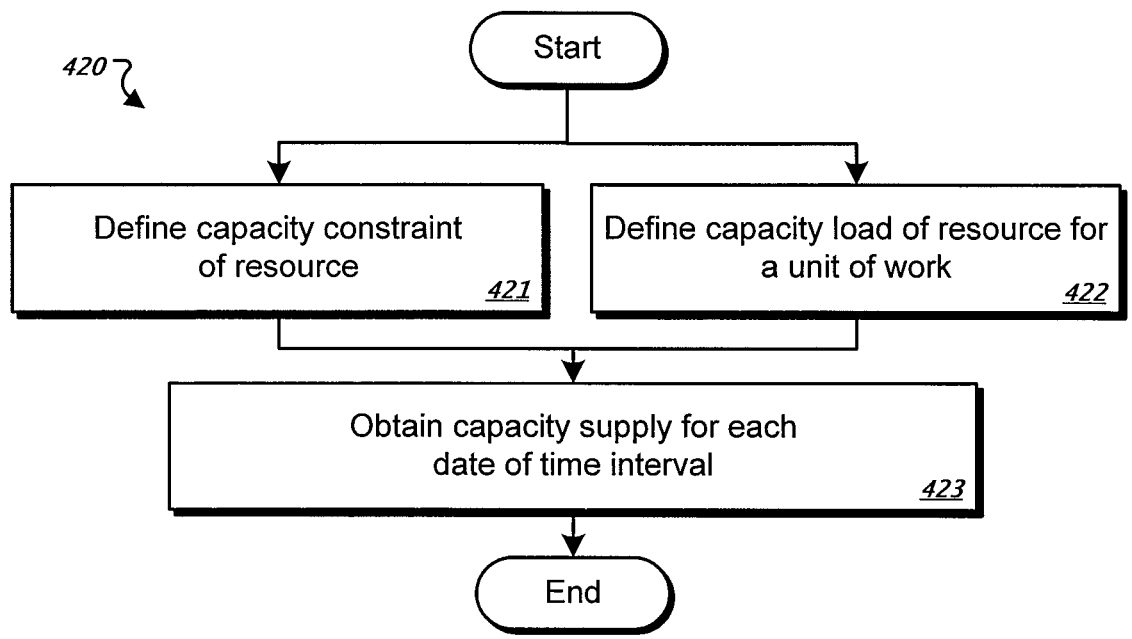
FIG. 4A-4D are flowcharts with further details of an example method used in the method of FIG. 4.

FIG. 4A shows an exemplary implementation of obtaining capacity supply information in step 420. In this example, a capacity constraint of the resource is defined in step 421. This may for example be x units per date, meaning that the resource has capacity to produce x units of the ware on a specific date. The capacity constraint may also vary depending on the date. For example, time-dependent limit values may be defined for the constraint. Additionally, in step 422, a capacity load of the resource for a unit of the ware may be defined. This may for example be y hours per unit meaning that the resource capacity is needed for y hours in order to produce one unit of the ware. The capacity load could be any suitable measure, like for example a weighing figure (e.g. capacity load for product A is z times an average value). In step 423, the capacity supply may then be obtained for each date of the time interval, thereby forming capacity supply information. In the example mentioned above, a capacity constraint of x units of ware and a capacity load of y hours per unit of ware would result in a capacity supply of x times y hours.

When using a supply chain management system, time proceeds and past supply and demand data may have to be updated. For product availability check, past product supply generally remains on stock. For capacity availability check however, past capacity supply may not be stored as time proceeds and is thus lost. Therefore, it has to be determined whether capacity supply has been lost or not.

In step 430 it is determined whether an update of the time interval is required, perhaps since time has proceeded. This may be the case when a corresponding update information is received indicating that the first date of the time interval has been set to a later date (for example shifting periods towards the future when the first period has passed). If an update is not required, the method proceeds to step 470. If an update is required, however, the first date of the time interval is set to the later date in step 440. Subsequently, in step 450, it is then determined whether capacity supply is unused for each date from the first date to the last date. In one implementation, the later date may be the date after the first date. In such a case, the determination of unused capacity supply needs only be carried out for one date.

Figure 4B:
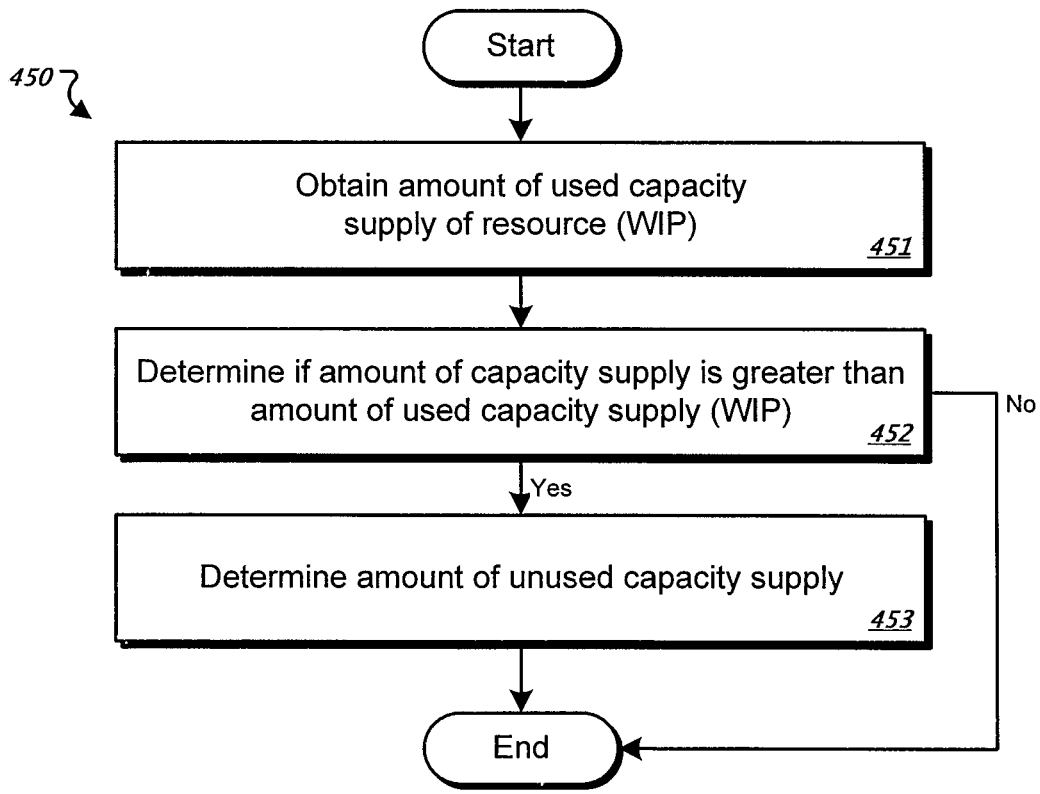

FIG. 4B shows an exemplary implementation of determining whether capacity supply is unused in step 450. In step 451 an amount of used capacity supply of the resource on that date is obtained. This may also be associated with work-in-process (WIP), an amount of production of a product for example. Subsequently, in step 452 it is determined if the amount of capacity supply on that date is greater than the amount of used capacity supply on that date. If this is the case, a certain amount of capacity supply has not been used to produce ware on that date and is therefore lost. In step 453, the amount of unused capacity supply is determined, for example by taking the difference between the amount of capacity supply and the amount of used capacity supply. As long as the capacity supply does not exceed the amount of used capacity supply (WIP), it is assumed that it has been used to produce that amount of the product.

Returning to FIG. 4, when an amount of unused capacity supply has been determined, that amount is then eliminated from the capacity supply information. When capacity is lost today, it cannot be used on subsequent days in the future anymore. The amount of unused capacity may for example be eliminated from the cumulated capacity supply. The amount of used capacity is not eliminated from the capacity supply information since it is assumed that it has been used to produce the product. Examples of eliminating unused capacity supply will be described in more detail with reference to FIG. 5A-5E.

The method may then proceed to step 470 of obtaining capacity demand information. This may be the case when a demand information is received representing a demand having a requested date. The capacity demand information for the resource may then be obtained. This capacity demand information may also be obtained at an earlier point of time. However, a received demand information may need to be updated. The capacity demand information comprises capacity demand for each date of the time interval and may be cumulated starting from the first date of the time interval as explained with reference to FIG. 2.

In step 480 a capacity availability check for the received demand is performed. This can be done in any suitable manner. For example, this can be done by performing a collective availability check for a set of demands. The capacity availability check (CAC) may be performed similarly to the product availability check (PAC).

Figure 4C:
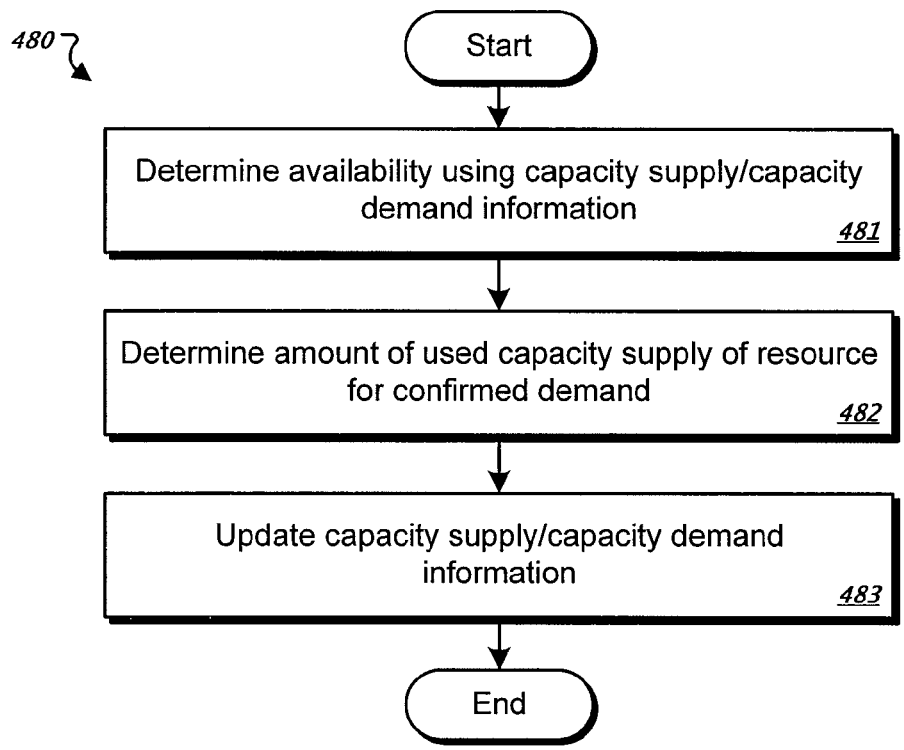

FIG. 4C shows an exemplary implementation of performing the capacity availability check in step 480. The implementation of FIG. 4C may for example be used in a pure make-to-stock environment where there is no supply on stock. The availability for a received demand can in such implementations thus be based only on using the capacity supply and capacity demand information (step 481). When there is no overconfirmation present, the received demand may be confirmed. In step 482, the amount of capacity supply of the resource used by the confirmed demand is then determined, which is the amount of used capacity as explained above. Subsequently, in step 483 the capacity demand and capacity supply information may be updated accordingly.

Figure 4D:
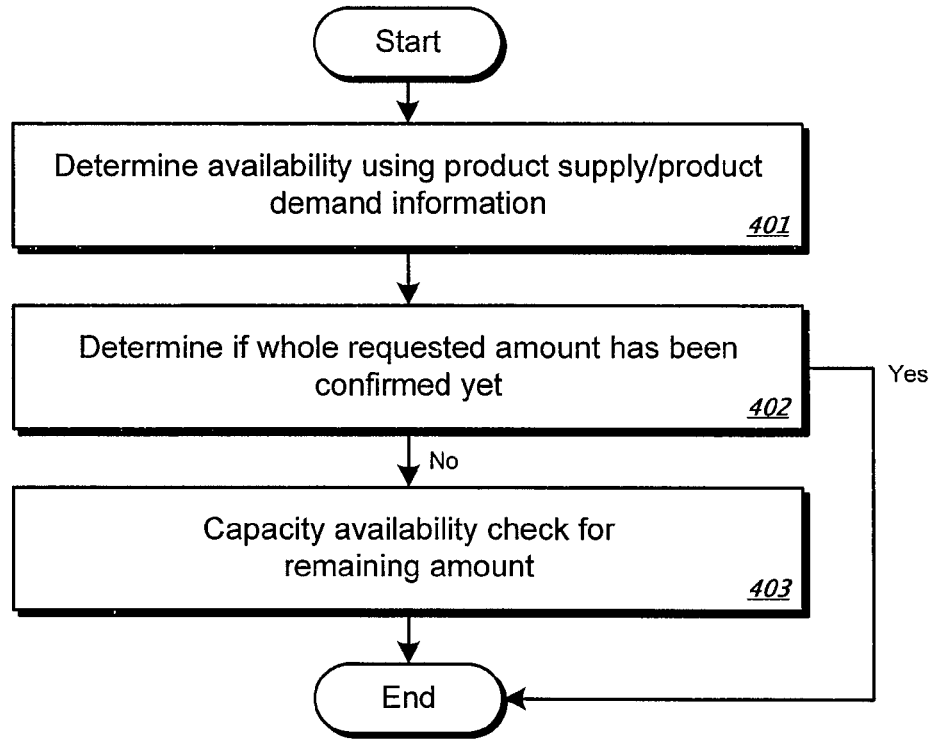

In environments where there is at least some product supply in stock, a product availability check may be used before performing a capacity availability check, as indicated in FIG. 4D. The availability for a specific demand may then first be based on checking the product availability. Therefore, in step 401 the availability is determined by product availability check, using product supply information and product demand information. This information may also be provided in the form of time series, for example cumulated starting from the first date of the time interval. In step 402 it is then determined if the whole requested amount of the received demand has been confirmed based on the product availability check. If this is not the case, in step 403, the remaining amount of the received demand may be determined by capacity availability check as described above. In such a case, the capacity demand and capacity supply information as well as the product supply and product demand information may be updated accordingly.

The capacity supply and capacity demand information may be updated synchronously with the product supply and product demand information, for example when a production order is created or released. The capacity supply and capacity demand information may also be updated asynchronously with the product supply and product demand information, for example only when an availability check is performed.

Figure 5A:
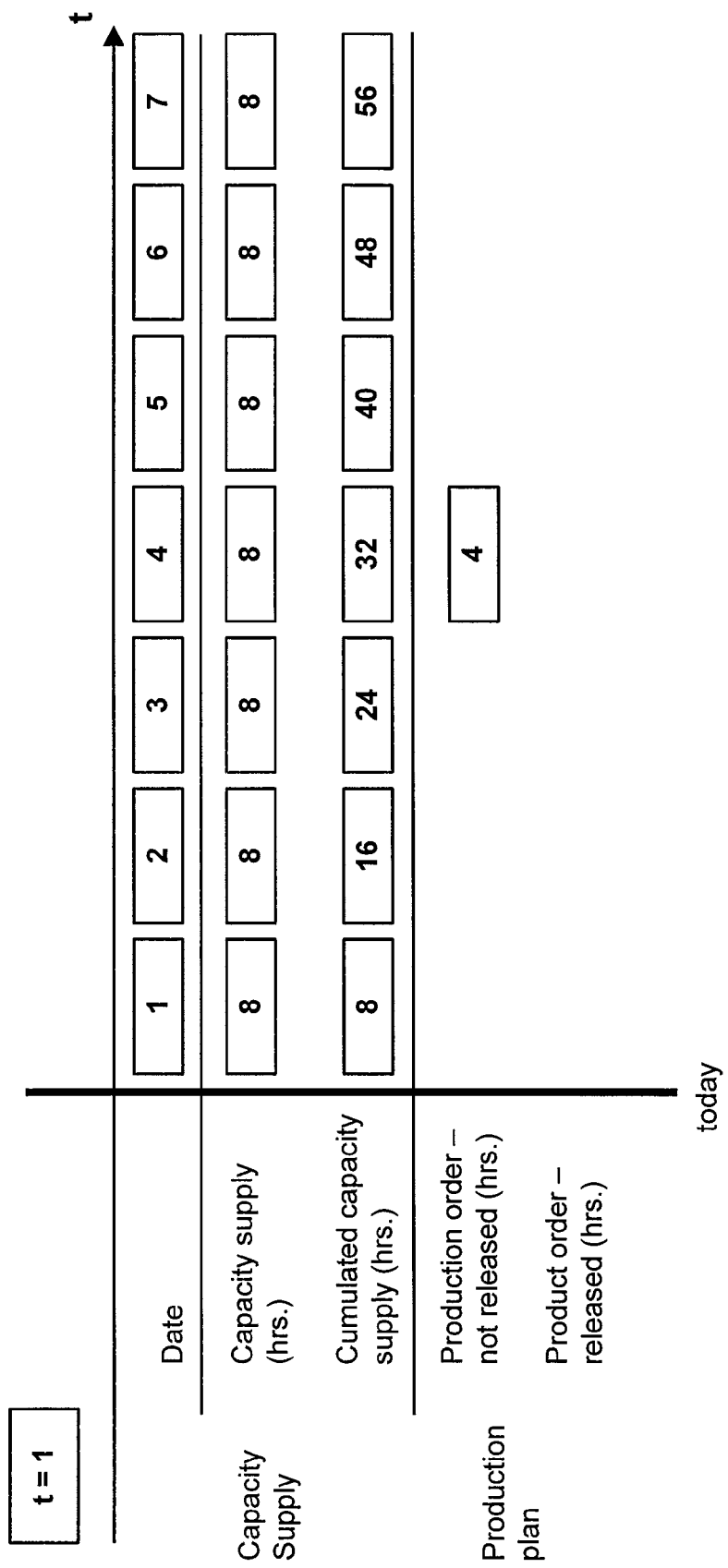
FIG. 5A-5E are diagrams showing an example execution of a computer-implemented method for checking the availability of a ware in a time interval.
Figure 5B:
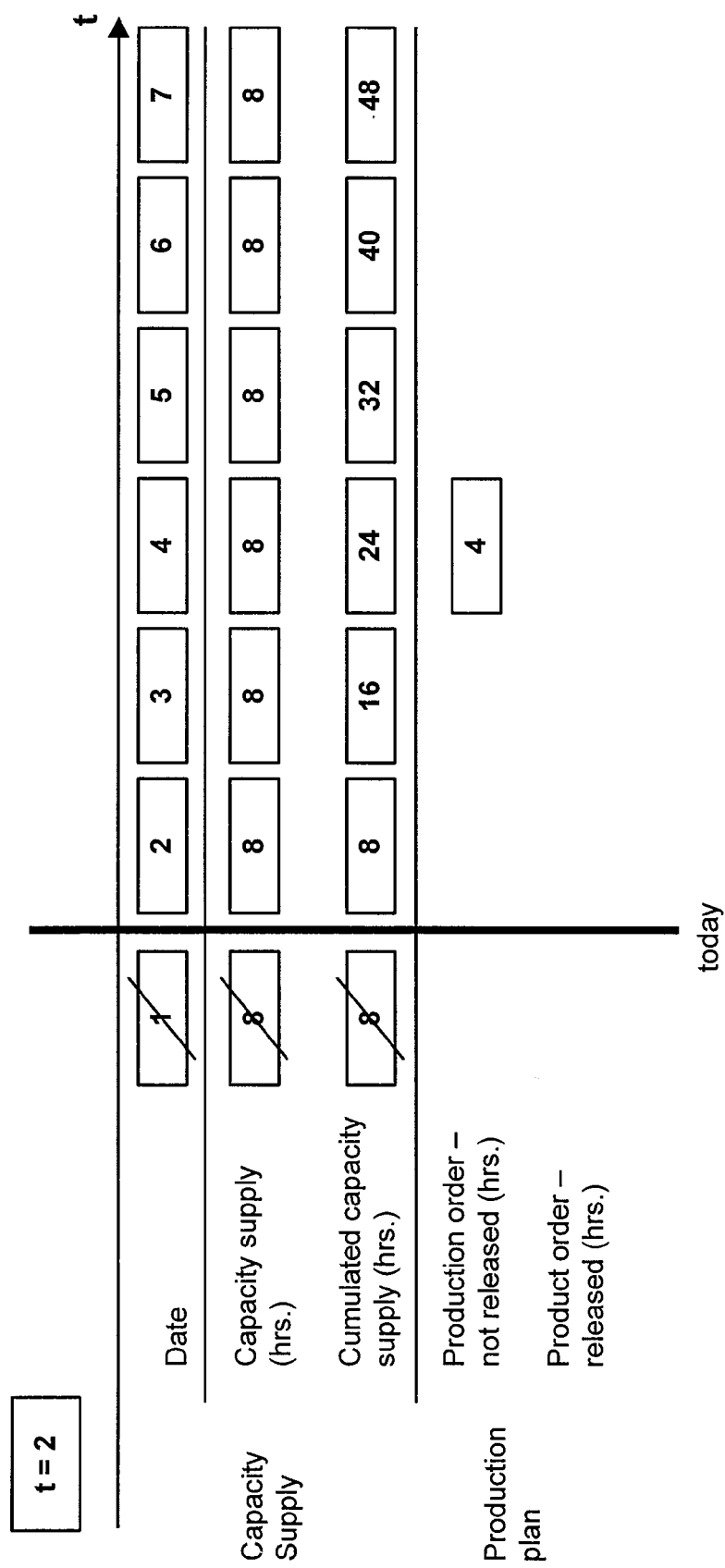
Figure 5C:
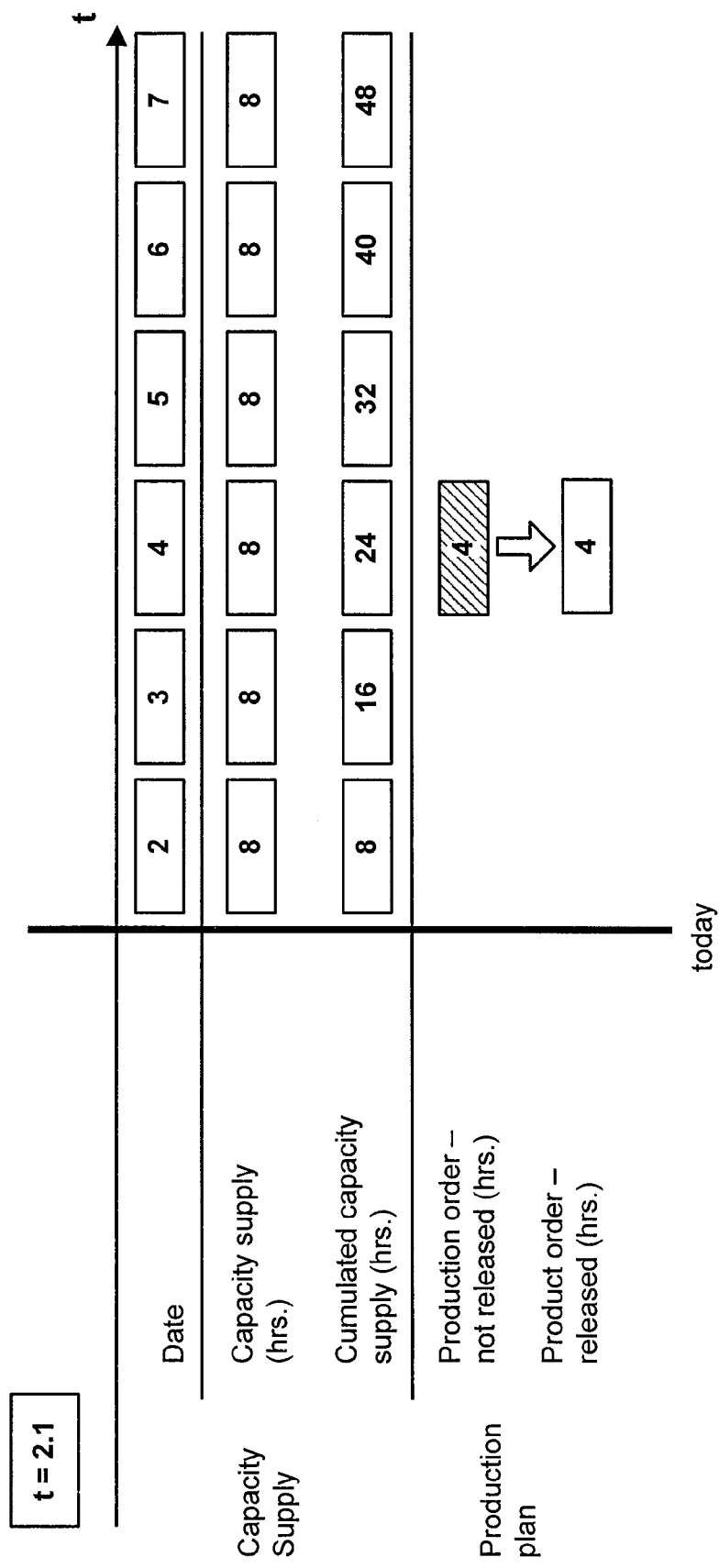

The method described above may also be used as capacity check when creating or releasing production orders (production plan). FIG. 5A-5E are diagrams showing an example execution of a method as described above for checking the availability of a ware in a time interval using a production plan. FIG. 5A shows for each date, or bucket, of the time interval ranging from date 1 through date 7 the capacity supply of the resource for a given product and its production plan. The amount of capacity supply as well as the production orders are expressed in terms of capacity units (hours the resource is used). In FIG. 5A, the capacity supply of the resource indicates that on each date the resource is available for 8 hours to produce the given product. The cumulated capacity supply is the sum of the capacity supply cumulated starting form the first date. In FIG. 5A, after having received a demand having a requested date, a production order of amount 4 (4 hours) is scheduled for requested date 4 (planned production order), but is not being released yet. As time proceeds, turning now to FIG. 5B, the capacity supply on date 1 becomes past supply because the today line has moved forward. Because no production order has been released yet, there is no used capacity supply of the resource on that date. The amount of 8 hours of capacity supply on date 1 has not been used and therefore needs to be eliminated from the capacity supply information, indicated by the diagonal line crossing out the amount. The cumulated capacity supply for dates 2 to 7 changes accordingly. FIG. 5C shows a point of time when the production order is released. At this point of time the demand having requested date 4 is not confirmed based on capacity anymore, but changes to being confirmed based on available product.

Figure 5D:
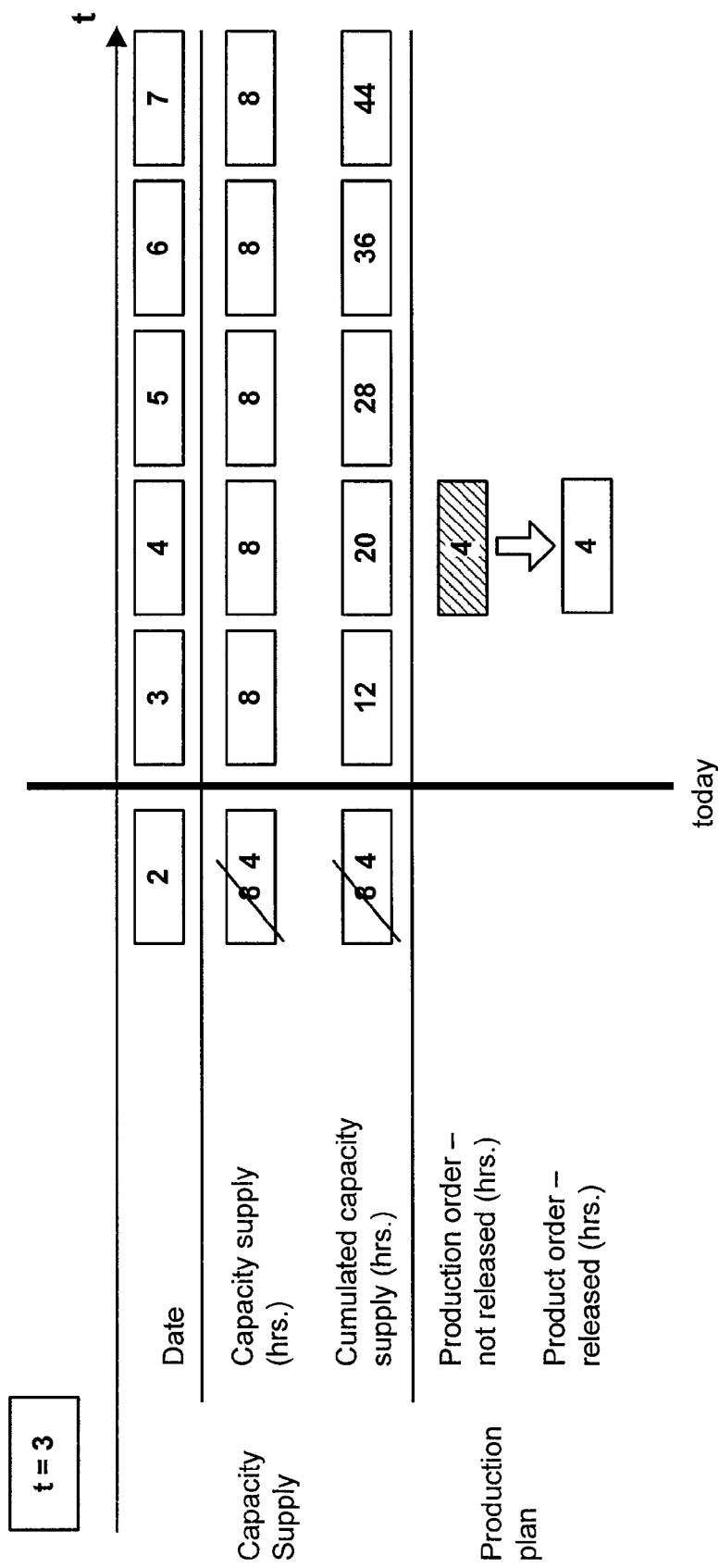
Figure 5E:
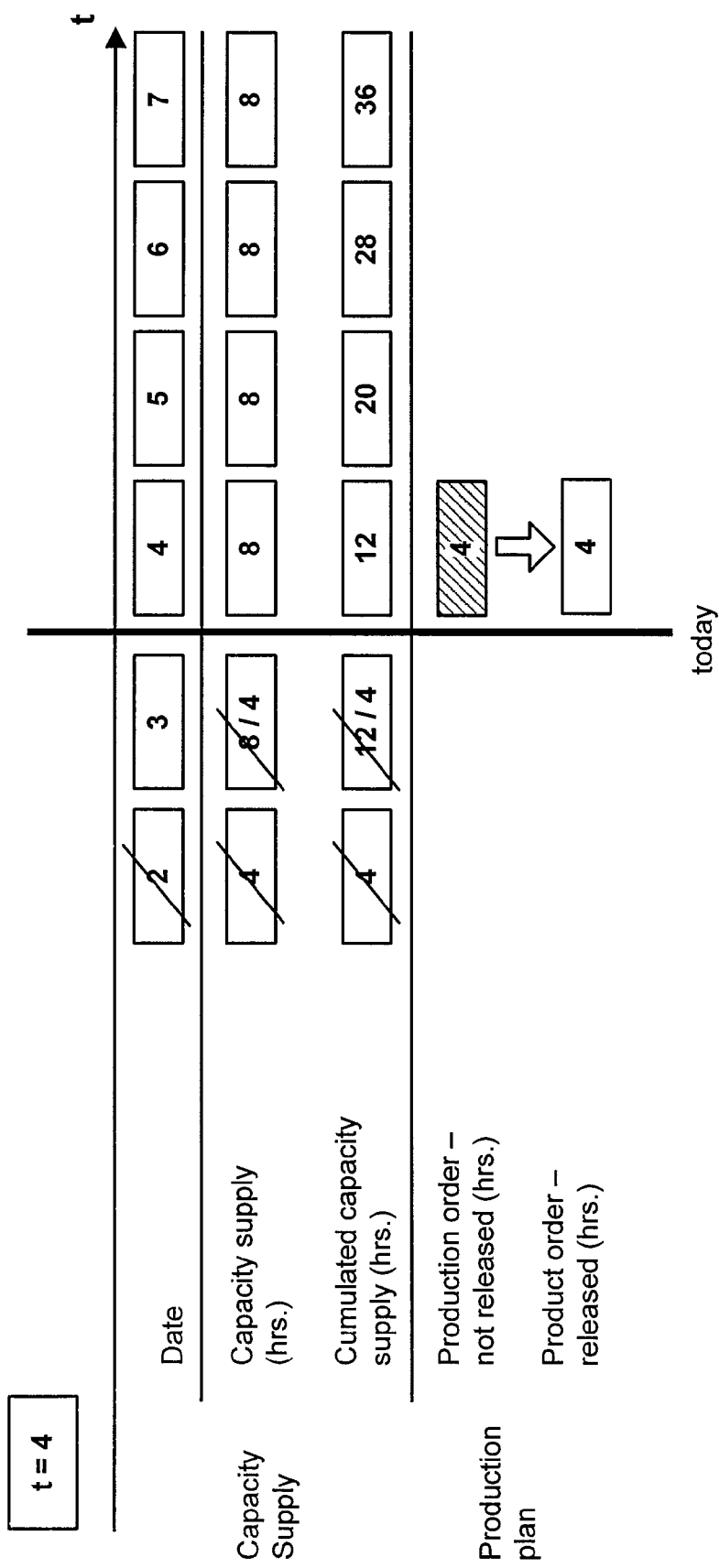

FIG. 5D shows another progression of time, when the today line has moved forward and capacity supply on date 2 becomes past capacity supply. Since a production order of amount 4 has now been released, an optimistic assumption is made that 4 hours of capacity supply on date 2 were not lost, but rather were used for the released production order to produce the product. Therefore, the amount of used capacity supply (WIP) on date 2 is 4. The amount of unused capacity on date 2 is thus 4, which is eliminated from the capacity supply information as indicated by the diagonal line crossing out the amount. The amount of used capacity of 4 is not eliminated since it has, according to the optimistic assumption, been used to produce the product. The cumulated capacity supply for dates 3 to 7 changes accordingly. In FIG. 5E the today line has moved forward to date 4 and the capacity supply on date 3 becomes past supply. Since the production order on requested date 4 is still set as released and a production confirmation has not been received yet, again the amount of used capacity of 4 is eliminated from the capacity supply. As time proceeds further, a production confirmation is expected to be received, in the best case confirming the optimistic assumption that 4 hours of capacity supply have been used to produce ware.

When a production order is released, the amount of capacity supply needs to be used product specific. Therefore, this amount of used capacity supply is no longer available for any other demands. When the production is anonymous, it is not known which demand is being produced by that amount of used capacity supply. Accordingly, the capacity demand cannot be reduced since it is not demand specific. If the capacity demand cannot be decreased, the capacity supply also cannot be decreased at that point of time.

Figure 6:
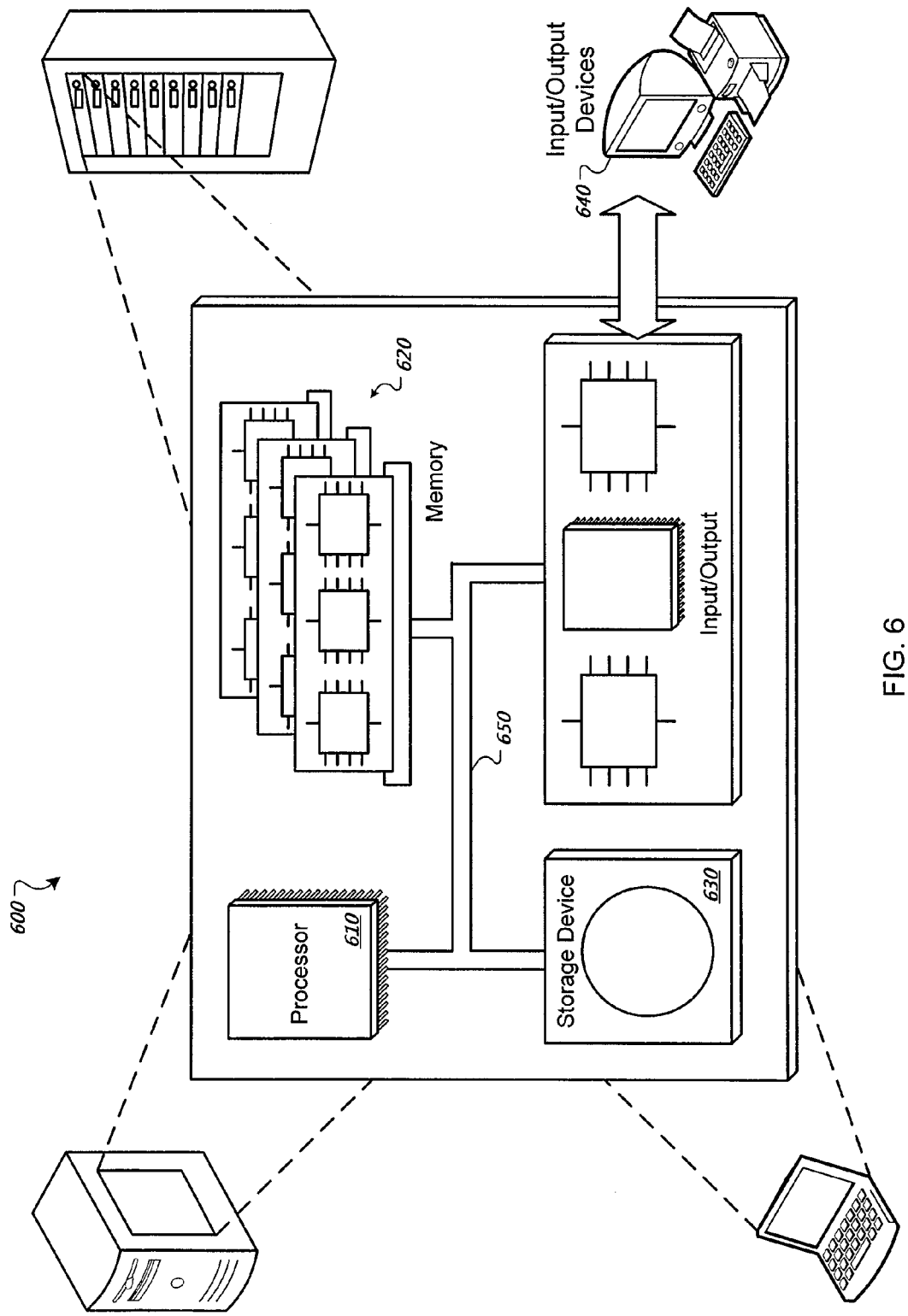
FIG. 6 is a block diagram of a computing system that can be used in connection with the data structures and computer-implemented methods described in this document.

FIG. 6 is a schematic diagram of a generic computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for checking availability of a ware in a time interval, a resource to produce the ware being associated with the ware, the method comprising:
   obtaining, by a computer system, capacity supply information of the resource comprising a capacity supply for each date of the time interval, wherein the time interval comprises a plurality of dates,
   obtaining, by the computer system, capacity demand information for the resource comprising a capacity demand for each date of the time interval,
   in response to receiving an update information indicating that a first date of the time interval has been set to a later date, for each date from the first date to the later date in chronological order:
      designating, for production by the resource on each date from the first date to the later date, production orders that have been released by each date until either i) the resource has no remaining capacity supply on each date or ii) all of the productions orders that have been released by each date have been designated,
      determining, by the computer system, whether the resource has capacity supply on each date from the first date to the later date that is unused after the designating, and
      if a specific amount of capacity supply is unused for each date from the first date to the later date, eliminating the specific amount of capacity supply from the capacity supply information to generate modified capacity supply information for the resource, and
      in response to receiving a demand information representing a demand having a requested date, determining availability of the resource on the requested date using the modified capacity supply information and the capacity demand information.

2. The method of claim 1, wherein the capacity supply and the capacity demand is each cumulated starting from a first date of the time interval.

3. The method of claim 1, wherein obtaining the capacity supply information comprises defining a capacity constraint of the resource.

4. The method of claim 1, wherein obtaining the capacity supply information comprises defining a capacity load of the resource for a unit of the ware.

5. The method of claim 1, wherein determining for a specific date whether capacity supply is unused comprises obtaining an amount of used capacity of the resource, used to produce ware on the specific date.

6. The method of claim 5, wherein a specific amount of capacity supply is unused, provided that the capacity supply on the specific date is greater than the amount of used capacity supply of the resource on the specific date.

7. The method of claim 6, wherein the amount of used capacity supply of the resource is associated with a production order of the ware.

8. The method of claim 1, wherein the resource is used to produce at least one other ware.

9. The method of claim 1, wherein at least one other resource is associated with the ware.

10. The method of claim 1, wherein the resource is a bottleneck resource.

11. The method of claim 1, wherein the update information indicates i) that time has passed since the time interval for the capacity supply information was defined, ii) that the first date is a past date, and iii) that the later date is a current date.

12. The method of claim 11, wherein the specific amount of capacity supply corresponds to unused capacity as of the current date that is lost and no longer usable.

13. A computer program product tangibly embodied in a computer-readable storage medium and comprising executable instructions that, when executed, perform operations for checking availability of a ware in a time interval, a resource to produce the ware being associated with the ware, the operations comprising:
   obtaining capacity supply information of the resource comprising a capacity supply for each date of the time interval, wherein the time interval comprises a plurality of dates,
   obtaining capacity demand information for the resource comprising a capacity supply for each date of the time interval,
   obtaining a capacity demand information for the resource comprising a capacity demand for each date of the time interval,
   in response to receiving an update information indicating that a first date of the time interval has been set to a later date, for each date from the first date to the later date in chronological order:
      designating, for production by the resource on each date from the first date to the later date, production orders that have been released by the date until either i) the resource has no remaining capacity supply on each date or ii) all of the productions orders that have been released by each date have been designated,
      determining, by the computer system, whether the resource has capacity supply on each date from the first date to the later date that is unused after the designating, and
      if a specific amount of capacity supply is unused for each date from the first date to the later date, eliminating the specific amount of capacity supply from the capacity supply information to generate modified capacity supply information for the resource, and
      in response to receiving a demand information representing a demand having a requested date, determining availability of the resource on the requested date using the modified capacity supply information and the capacity demand information.

14. The computer program product of claim 13, wherein the capacity supply and the capacity demand is each cumulated starting from a first date of the time interval.

15. The computer program product of claim 13, wherein obtaining the capacity supply information comprises defining a capacity constraint of the resource.

16. The computer program product of claim 13, wherein obtaining the capacity supply information comprises defining a capacity load of the resource for a unit of the ware.

17. The computer program product of claim 13, wherein determining for a specific date whether capacity supply is unused comprises obtaining an amount of used capacity of the resource, used to produce ware on the specific date.

18. The computer program product of claim 17, wherein a specific amount of capacity supply is unused, provided that the capacity supply on the specific date is greater than the amount of used capacity supply of the resource on the specific date.

19. The computer program product of claim 18, wherein the amount of used capacity supply of the resource is associated with a production order of the ware.

20. A computing system programmed to perform operations for checking availability of a ware in a time interval, a resource to produce the ware being associated with the ware, the operations comprising:

obtaining capacity supply information of the resource comprising a capacity supply for each date of the time interval, wherein the time interval comprises a plurality of dates, obtaining capacity demand information for the resource comprising a capacity demand for each date of the time interval, in response to receiving an update information indicating that a first date of the time interval has been set to a later date, for each date from the first date to the later date in chronological order:
   designating, for production by the resource on each date from the first date to the later date, production orders that have been released by the date until either i) the resource has no remaining capacity supply on each date or ii) all of the productions orders that have been released by each date have been designated,
   determining, by the computer system, whether the resource has capacity supply on each date from the first date to the later date that is unused after the designating, and
   if a specific amount of capacity supply is unused for each date from the first date to the later date, eliminating the specific amount of capacity supply from the capacity supply information to generate modified capacity supply information for the resource, and in response to receiving a demand information representing a demand having a requested date, determining availability of the resource on the requested date using the modified capacity supply information and the capacity demand information.

\* \* \* \* \*